Figure 1:
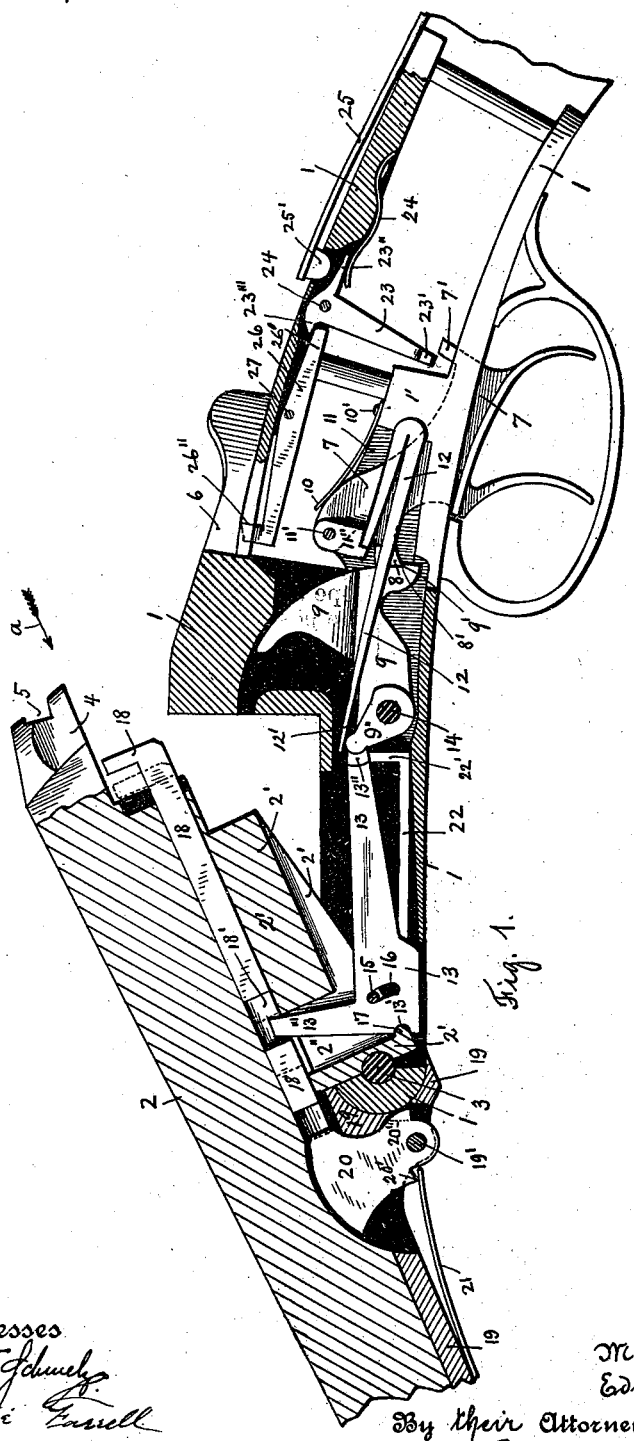

(No Model.) 4 Sheets—Sheet 1.

M. BYE & E. G. PARRY.
BREECH LOADING FIREARM.

No. 490,065. Patented Jan. 17, 1893.

Witnesses
Chas. F. Schmelz
Katie Farrell

Inventors
Martin Bye,
Edward G. Parry,
By their Attorney
John C. Dewey

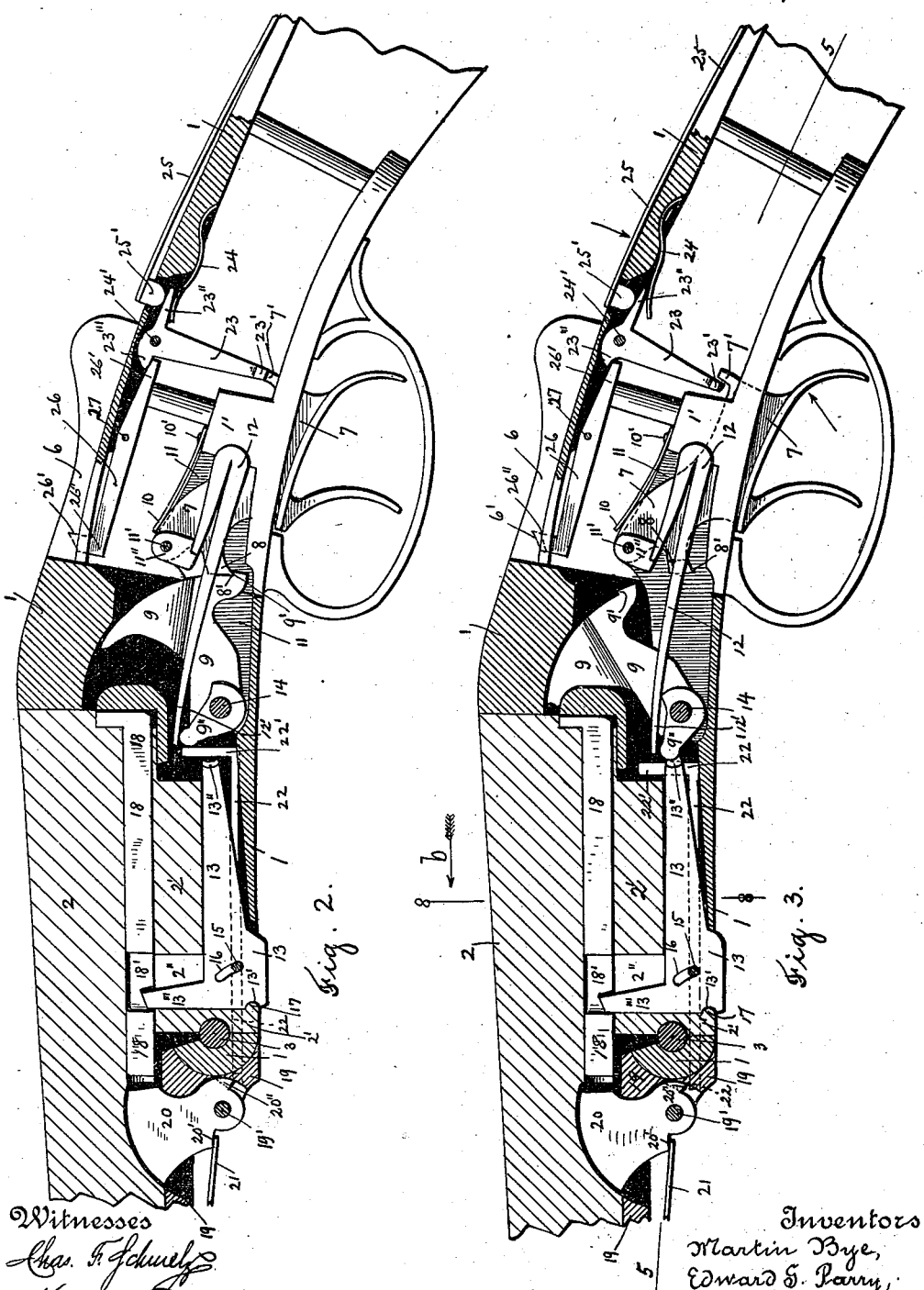

(No Model.) 4 Sheets—Sheet 3.
M. BYE & E. G. PARRY.
BREECH LOADING FIREARM.
No. 490,065. Patented Jan. 17, 1893.
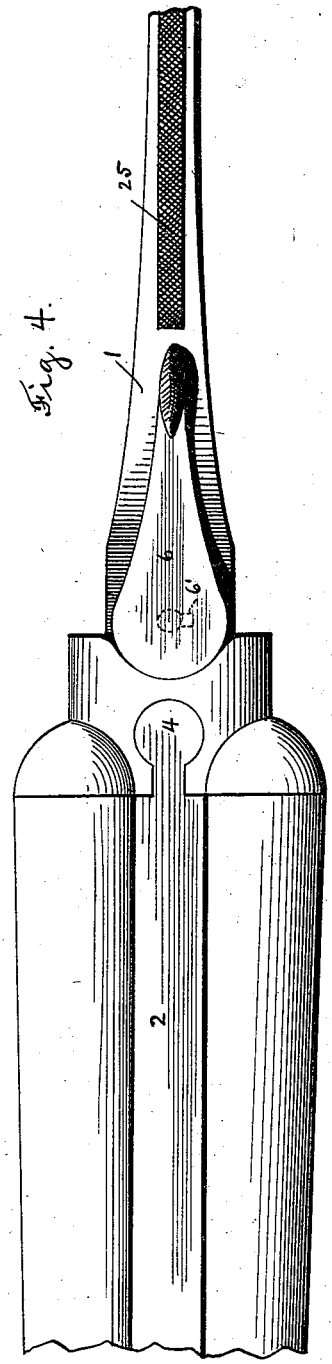
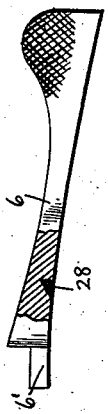
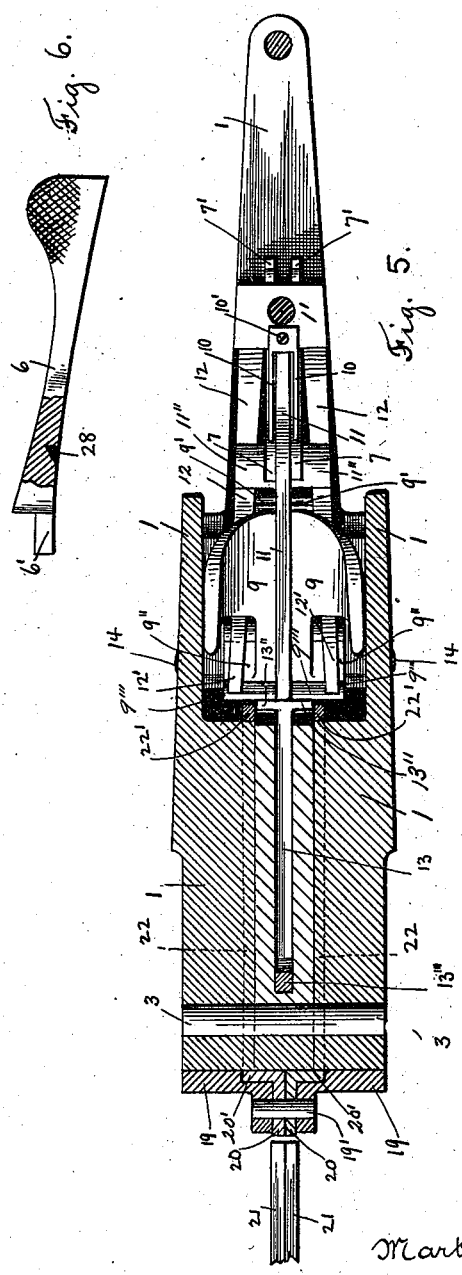
Witnesses
Chas. F. Schmelz
Katie Farrell
Inventors
Martin Bye
Edward G. Parry,
By their Attorney
John E. Dewey (No Model.) 4 Sheets—Sheet 4.
M. BYE & E. G. PARRY.
BREECH LOADING FIREARM.
No. 490,065. Patented Jan. 17, 1893.
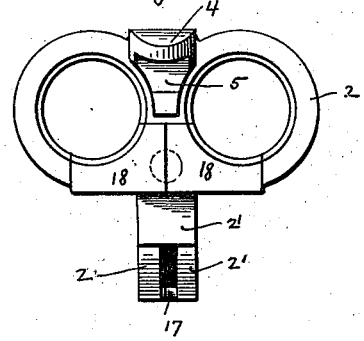
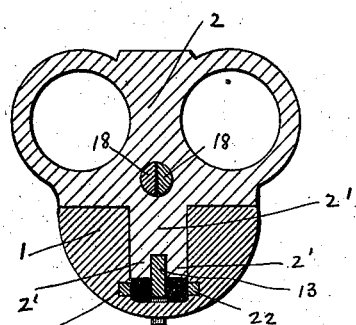
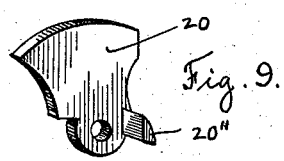
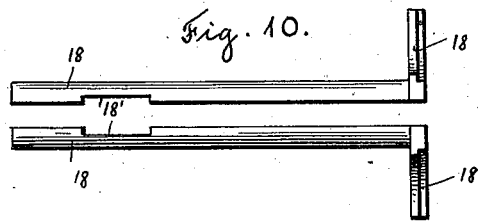
Witnesses  
Inventor  
Martin Bye  
Edward G. Parry,  
By their Attorney  
John C. Dewey

UNITED STATES PATENT OFFICE.

MARTIN BYE AND EDWARD G. PARRY, OF WORCESTER, MASSACHUSETTS.

BREECH-LOADING FIREARM.

SPECIFICATION forming part of Letters Patent No. 490,065, dated January 17, 1893.

Application filed August 20, 1892. Serial No. 443,658. (No model.)

*To all whom it may concern:*

Be it known that we, MARTIN BYE and EDWARD G. PARRY, both citizens of the United States, residing at Worcester, in the county of Worcester and State of Massachusetts, have invented certain new and useful Improvements in Breech-Loading Firearms; and we do hereby declare that the following is a full, clear, and exact description thereof, which, in connection with the drawings making a part of this specification, will enable others skilled in the art to which our invention belongs to make and use the same.

Our invention relates to breech loading fire arms, and more particularly to that class of fire arms termed "break down hammerless guns."

The object of our invention is to improve upon and simplify the construction of breech loading fire arms of the class above referred to, and to provide a breech loading fire arm which will be effective in operation, and not liable to get out of order.

Our invention consists in certain novel features of construction and operation of a breech loading fire arm, and relates more particularly to the cocking and firing mechanism, and the automatic cartridge shell ejector, and the trigger safety locking mechanism.

We have shown in the drawings our improvements applied to a double barrel gun, but they may be equally well applied to and used in a single barrel gun if desired.

Referring to the drawings:—Figure 1 is a longitudinal section of the gun, showing the position of the several parts after the gun has been fired, and the barrel portion broken down, preparatory to re-loading the gun. Fig. 2 corresponds with Fig. 1, but shows the barrel locked to the stock, preparatory to firing, and the triggers locked. Fig. 3 corresponds to Fig. 2, but shows the triggers unlocked, and the position of the parts after the gun has been fired, and previous to breaking down the gun. Fig. 4 is a top view of the gun shown in Fig. 3. Fig. 5 is a horizontal section through the frame, taken at the point indicated by line 5, 5, Fig. 3. Fig. 6 is a detail of the top lever, showing the cam groove in the underside thereof. Fig. 7 is an end view of the barrel portion, looking in the direction of arrow $a$, Fig. 1. Fig. 8 is a cross section on line 8, 8, Fig. 3, looking in the direction of arrow $b$, Fig. 3. Fig. 9 shows one of the shell ejector hammers, and, Fig. 10 represents the two halves of which the shell ejector is composed.

We have shown in the drawings only such portions of a breech loading fire arm, as are necessary to illustrate the nature of our improvements applied thereto.

In the accompanying drawings, 1 is the frame of the gun, 2 the barrel portion, hinged to the front part of the frame on the pin 3. The mid rib 4 of the barrel portion is provided with a notch 5, at its rear end, see Fig. 1, which is engaged by the nose 6', see Fig. 6, on the top lever 6, to lock the barrel portion 2 to the frame 1, all in the usual way in this class of fire arms.

We will now describe our cocking and firing mechanism. The trigger 7, and sear 8 are made in one piece, and the nose 8' of the sear 8 is held in its forward position to engage the notch 9' in the hammer 9, to hold the same cocked, as shown in Fig. 1, by a spring 10 secured at its rear end by a screw 10' on the frame 1. The triggers 7 extend through slots in the central portion of the frame 1, and are pivoted at their upper ends on a pin 11'. The lower strap or trigger plate, as it is usually termed, is made in box form, with a central web 11, to strengthen and firmly hold the firing mechanism in proper positon, the slots for receiving the triggers being extended through to the guard seats, so that the sear noses 8' may pass through in putting the parts together. The main spring 12 is retained in place by being held between the portion 1' of the frame and a notch in the underside of the side extensions 11" of the central web 11, see Figs. 1 and 5. The forward ends 12' of the main springs 12 are brought forward to bear upon the roll 9" on the inner end of the hammer, above the pivot point thereof, as indicated in Figs. 1 and 5. The hammer 9 is hung on a pin 14 secured in the stock, and is provided with a notch 9' over which the sear nose 8' extends, when the hammer is cocked, as shown in Figs. 1 and 5. The hammers are cocked on the breaking down of the gun, as shown in Fig. 1, by means of the cocking lever 13, (there is but one cocking lever for both hammers). The cocking lever 13 is supported in the central line of the stock portion, and is held in place by a pin 15 which extends into a slot 16 in the cocking lever. The cocking lever 13 has a circular seat 13′ in the lower portion thereof into which extends the knob 17 on the lower portion of the barrel lug 2′. By means of the seat 13′ and the knob 17, forming the pivot connection between the cocking lever and the barrel portion, the pivot point of the cocking lever is brought to the extreme lower point of the barrel lug without disfiguring or interfering with the symmetrical form of the gun. The inner end of the cocking lever 13, is provided with side extensions 13″, see Figs. 1 and 5, which are adapted to bear against rolls 9‴ on the inner ends of the hammers 9, see Figs. 1 and 5. Thus the friction between the cocking lever and the hammers is avoided to a great extent, and the hammers, cocking lever, and barrel lug with the knob 17 thereon, form a kind of a knuckle joint, and in the act of opening and cocking the gun the leverage increases and makes it feel easy to handle. The other end 13‴ of the cocking lever 13 extends up through an opening 2″ in the barrel lug 2 and into the notched or cut out portion 18′ of the shell extractors 18 for the purpose of forcing out the shell extractors slightly, upon the breaking down of the gun as shown by dotted lines Fig. 1, to start the cartridge shells in the ordinary way. The shell extractor is shown made in two parts or halves, see Fig. 10, to be operated by the cartridge shell ejector mechanism, to be hereinafter described.

The operation of the cocking hammers by the cocking lever, on the breaking down of the gun, will be readily understood from the above description, in connection with the drawings, and is as follows: After the gun has been fired, and the hammers and cocking lever are in the position shown in Fig. 3, the breaking down of the gun, as shown in Fig. 1, will cause the cocking lever to be moved on its pivot point, and force the hammers back, until the same are fully cocked and held by the sears 8, see Fig. 1. The closing of the gun will return the cocking lever to its normal position, disconnecting the end thereof from the hammers, as shown in Fig. 2, and the gun is ready to be fired.

We will now proceed to describe our improved shell ejector mechanism, which may be combined and used with the cocking and firing mechanism shown in the drawings, or with any other cocking and firing mechanism. In a plate 19, secured to the underside of the barrel portion 2, and having a hinge joint on the rounded end 1″ of the frame 1, are hung on a pin 19′, two ejector hammers 20, the upper ends of which extend into a slot in the underside of the barrel portion 2. The striking portions of the ejector hammers 20 are adapted to strike against the inner ends of the two halves of the shell extractor 18. Two springs 21 are secured at one end to the plate 19, with their free ends extending over the projection 20′ on the shell extractor hammers 20, and serve to return the hammers 20 to their normal position, and force the same against the ends of the shell extractor 18. The shell extractor hammers 20 are moved backward upon the breaking down of the gun, by means of two slides 22, supported in the frame portion, as indicated by dotted lines Fig. 5, one each side of the cocking lever 13, and adapted to have a slight sliding motion. One end of the slide 22 is provided with an upward extension 22′, against which the roll 9‴ on the hammer extension 9″ bears, and the other end of the slide is adapted to engage a projection 20″, on the shell extractor hammer 20, as indicated in Fig. 3, so that when the gun is broken down after it has been fired, the end 22′ of the slide 22 is held against the roll 9‴ on the hammer, as shown in Fig. 3, and the other end of the slide engages the projection 20″ on the shell extractor hammer 20, and causes the hammer to be moved on its pivot point, against the action of the springs 21, until it has reached such a position that the end of the slide 19 will pass by the projection 20″ on the hammer 20, and allow the spring 21 to act to force the hammer back and strike the end of the shell extractor 18, and force it out as far as the end 13‴ of the cocking lever extending into the cut out portions 18′ of the shell extractor 18 will allow, as shown in Fig. 1, and thus automatically eject the cartridge shell after the gun has been fired. The closing down of the gun will bring the inner edge of the shell extractor hammer 20 against the end of the slide 22, and force the slide back against the firing hammer, as shown in Fig. 2, and the releasing of the firing hammer on firing the gun, will force the slide 22 forward, to again engage the projection on the shell extractor hammer 20, as shown in Fig. 2, to operate the same upon the breaking down of the gun, as above described.

We will now proceed to describe the trigger safety locking mechanism, which we have shown combined and adapted to be operated with the form of cocking and firing mechanism shown in the drawings, but which may be adapted to be combined with any other form of cocking and firing mechanism. The locking lever 23 is pivoted at its upper end on a pin 24′ in the upper portion of the frame, and the lower end of the locking lever is in this instance provided with side extensions 23′ adapted to extend over a projection 7′ on the rear portion of each trigger, as shown in Fig. 2, so as to lock the triggers. The locking lever 23 is acted on by a flat spring 24, secured in the upper portion of the frame, and the free end of said spring 24 bears on the underside of the rear projection 23″ on the locking lever 23, to hold the lower end of the locking lever over the projections 7′ on the triggers 7, and thus lock the triggers. A spring arm 25 extends upon the upper side of the frame, and is provided at its forward end with a knob 25' which extends through the opening in the frame, and is adapted to bear at its lower end, when the spring 25 is pressed inwardly in the act of grasping the gun to discharge the same, against the rearward extension 23" of the locking lever 23, and move said locking lever on its pivot point against the action of the spring 24 to disengage the lower end of the locking lever from the projections 7' on the triggers 7, and allow the triggers to be pulled, as shown in Fig. 3. When the spring arm 25 is released, the locking lever 23 will immediately return to its former position, actuated by the spring 24, and block the other trigger, in case only one barrel has been discharged.

The locking lever 23 is also operated to unlock the triggers independently of the action of the spring arm 25, through the intermediate lever 26 hung on a pin 27, with its rear end 26' extending under and engaging a projection 23''' on the locking lever 23, and the other end 26' extending into a cam groove seat 28, in the under side of the lever 6, see Fig. 6. The moving of the top lever to one side, to allow the barrels to be broken down, will act on the intermediate pivoted lever 26, to cause the end 26' thereof, engaging the locking lever 23, to be moved upward and move the locking lever 23 on its pivot pin to unlock the triggers, as shown in Fig. 1, so that the triggers may move on their pivot pin, and the sears 8 pass over the notches 9' on the hammers, as the hammers are re-cocked on the breaking down of the gun.

The trigger and sear as shown in the drawings, and above described, are made integral, and in order to allow the hammer to be cocked upon the breaking down of the gun, the sear must be free to move out of the path of the hammer, to allow the engaging notch on the hammer to pass by the sear nose, and therefore the safety locking mechanism must be operated to unlock the trigger and sear upon the breaking down of the gun.

The safety locking mechanism may be adapted to lock the sear instead of the trigger, in case the trigger and sear are made separately, in the ordinary way.

The locking lever of the safety locking mechanism may not come in direct contact with the trigger or sear, to lock the same, but may be arranged to operate an intermediary lever which engages the trigger or sear.

From the above description in connection with the drawings, the operation of the trigger safety locking mechanism, will be readily understood by those skilled in the art.

Our improved shell ejector mechanism, and trigger safety locking mechanism are adapted to be combined with any ordinary form of the breech loading fire arms, of the class referred to, and may be used together in connection with the cocking and firing mechanism, or used separately, as desired.

It will be understood, that the details of construction of the several parts of our improvements may be varied some from what is shown and described, if desired.

Having thus described our invention, what we claim as new, and desire to secure by Letters Patent, is:—

1. In fire-arms, the combination with the hammer, of a cocking lever pivotedly connected with the barrel lug, and engaging and cocking the hammer with one end, and moving the shell extractor with its other end, upon the breaking down of the gun, substantially as set forth.

2. In fire-arms, the combination with the hammer, of the cocking lever, engaging and cocking the hammer on the breaking down of the gun, and connected with the barrel lug by a pin extending through a slot in said lever, and the hinge joint of said lever with the barrel lug formed by a knob on the barrel lug extending into a seat in the cocking lever, substantially as shown and described.

3. In fire-arms, the combination with the barrel lug, of a cocking lever attached thereto, in the manner substantially as shown, and one end of said lever engaging and cocking the hammer, and the other end of said lever engaging the shell extractor upon the breaking down of the gun, substantially as set forth.

4. The combination with the barrel lug, of the cocking lever having its hinge joint with the barrel lug formed by a knob on the lower side of the barrel lug extending into a seat in the cocking lever, and said lever retained in place by a pin in the barrel lug extending through a slot in the lever, substantially as shown and described.

5. In fire-arms of the class described, the combination with the shell extractor, provided with a cut out portion into which one end of the cocking lever extends, which lever engages and cocks the firing hammer, and is pivotally connected with the barrel lug, of means for operating said shell extractor to automatically eject the shells on the breaking down of the gun, consisting of a hammer hung on the underside of the barrel portion at the forward end of the frame, said hammer engaging the end of the shell extractor, and a spring for actuating said hammer, and a longitudinal moving slide interposed between the cocking hammer and the shell ejector hammer, for moving said shell ejector hammer against the action of the spring, preparatory to its engaging the shell extractor, substantially as set forth.

6. In fire-arms of the class described, the combination with the hammer, and the hammer cocking lever pivotedly connected with the barrel lug, with one end engaging the hammer, and the other end engaging the shell extractor, of a spring actuated ejector hammer hung on the barrel portion, and adapted to strike against the end of the shell extractor, and a slide extending between said ejector hammer, and the firing hammer, for moving said ejector hammer preparatory to its engaging the shell extractor, for the purpose stated, substantially as set forth.

7. In fire arms of the class described, the combination with the shell extractor provided with cut out portions into which one end of the cocking lever extends, of means for operating said shell extractor to automatically eject the shells on the breaking down of the gun, consisting of two hammers hung on the underside of the barrel portion of the gun at the forward end of the frame, said hammers engaging the ends of the shell extractors, and springs for actuating said hammers, and longitudinally moving slides interposed between the firing hammers and the ejector hammers, for moving said ejector hammers against the action of the springs preparatory to their engaging the shell extractor, substantially as set forth.

8. In fire arms of the class described, the combination with the shell extractor made in two halves, with cut out portions into which one end of the cocking lever extends, of means for operating said shell extractor to automatically eject the shells on the breaking down of the gun, consisting of a hammer hung on the underside of the barrel portion of the gun, at the forward end of the frame, said hammer engaging the end of the shell extractor, and a spring for actuating said hammer, and a longitudinally moving slide between the cocking hammer and the shell extractor, for moving said ejector hammer against the action of the spring preparatory to its engaging the shell extractor, substantially as set forth.

9. In fire-arms of the class described, the safety locking mechanism, consisting of a spring actuated lever pivoted in the upper part of the frame, with its lower end adapted to operate to lock or unlock the trigger, of means for operating the locking lever to unlock the trigger upon the breaking down of the gun, consisting of a lever pivoted in the upper part of the frame, with one end engaging the spring actuated lever, and the other end extending into a cam groove in the top lever, substantially as set forth.

10. In fire-arms of the class described, the safety locking mechanism, consisting of a spring actuated lever, pivoted in the upper part of the frame, with its lower end adapted to operate to lock or unlock the trigger or sear, of means for operating said lever to unlock the trigger or sear upon the breaking down of the gun, consisting of a pivoted lever, with one end engaging the spring actuated lever, and the other end extending into a cam groove in the top lever, substantially as shown and described.

11. In a fire-arm, the safety locking mechanism, consisting of a spring actuated lever, pivoted in the upper portion of the frame, with its lower end adapted to operate to lock or unlock the trigger or sear, and a spring for actuating said lever to cause the same to operate to lock the trigger or sear, of means for operating said lever to unlock the trigger or sear, consisting of a spring arm extending upon the upper side of the frame, with its free end adapted to engage said lever, to cause the same to unlock the trigger or sear, and an intermediary pivoted lever, with one end engaging said spring actuated lever, and the other end extending into a cam groove in the top lever, the moving of the top lever to break down the gun causing said intermediary lever to operate the spring actuated lever to unlock the trigger or sear, substantially as shown and described.

MARTIN BYE.
EDWARD G. PARRY.

Witnesses:
KATIE FARRELL,
JOHN C. DEWEY.